United States Patent [19]

Sonetaka

[11] Patent Number: 4,937,818
[45] Date of Patent: Jun. 26, 1990

[54] TIME DIVISION MULTIPLE ACCESS RADIO COMMUNICATION SYSTEM

[75] Inventor: Noriyoshi Sonetaka, Tokyo, Japan

[73] Assignee: NEC Corporation, Japan

[21] Appl. No.: 385,976

[22] Filed: Jul. 26, 1989

Related U.S. Application Data

[63] Continuation of Ser. No. 246,429, Sep. 19, 1988, abandoned.

[30] Foreign Application Priority Data

Sep. 21, 1987 [JP] Japan ................................ 62-236488

[51] Int. Cl.$^5$ ............................................... H04J 3/16
[52] U.S. Cl. ................................................ 370/95.3
[58] Field of Search ............... 370/95, 104, 94, 89, 370/95.3; 455/7, 12, 33, 31, 53, 54, 56; 379/56, 58, 60

[56] References Cited

U.S. PATENT DOCUMENTS

| | | | |
|---|---|---|---|
| 4,355,388 | 10/1982 | Deal, Jr. | 370/95 |
| 4,602,366 | 7/1986 | Takumi | 370/94 |
| 4,686,673 | 8/1987 | Hotta | 370/104 |
| 4,736,371 | 4/1988 | Tejima et al. | 370/95 |

Primary Examiner—Benedict V. Safourek
Assistant Examiner—Wellington Chin
Attorney, Agent, or Firm—Laff, Whitesel, Conte & Saret

[57] ABSTRACT

In a TDMA radio communication system consisting of a master station and a plurality of slave stations, the master station performs channel control for sending time slot assignment information to only a calling slave station in response to a time slot assignment request from a calling slave station.

The calling slave station performs transmission control. In this control, the calling slave station detects an address of a destination device from an input transmitting signal, determines a called slave station based on the detected address, adds the address of the called slave station to the input transmitting signal to form a transmission signal, and inserts the transmission signal in the assigned time slot.

4 Claims, 4 Drawing Sheets

TIME DIVISION MULTIPLE ACCESS RADIO COMMUNICATION SYSTEM

This application is a continuation of application Ser. No. 246,429, filed Sept. 19, 1988, now abandoned.

BACKGROUND OF THE INVENTION

The present invention relates to a time division multiple access (TDMA) radio communication system and, more particularly, to an improvement in channel assignment, i.e., slot assignment of the TDMA radio communication system.

As is well known, in a TDMA radio communication system, a plurality of stations connected through the TDMA channel are constituted by one (or two or more) master station and a large number of slave stations, each of which receives a reference signal transmitted from the master station and sets a transmitting-/receiving timing of its own. Each slave station transmits a communication signal in a burst format in a channel, i.e., a time slot, which is time-divisionally assigned to the slave station, thus performing communication. A demand assignment system for assigning a time slot in response to each assignment request from the slave station is known as a system of assigning a slot to each slave station. This system is well known in a satellite communication system.

FIG. 1 shows a transmitting operation sequence of a TDMA radio communication system employing a conventional demand assignment system. In FIG. 1, when a calling station receives a transmitting signal from a terminal or an exchanger and detects a calling signal therefrom in step (A), it sends to a master station a channel connection request added with an identification number of its own and an identification number of a slave station serving as a called station. In step (B), the master station performs channel connection control for checking availability of the channel, i.e., searching of the presence/absence of vacant time slots and a connection condition of the channel, i.e., checking whether or not the receiving station is busy. If a vacant slot is found and the receiving station is not busy, the master station sends back an acknowledge response (ACK) for the channel connection request to the calling station. In step (C), the calling station sends to the master station a slot assignment request prepared by adding a necessary time slot count to an identification number of the slave station serving as the called station.

In steps (D) and (E), the master station performs channel control. That is, the master station retrieves a channel assignment condition, determines a slot to be assigned, and sends slot assignment information to the calling and called stations. The slot assignment information sent to the called station includes assignment information of a slot used when the called station transmits data, and information indicating a slot assigned to the calling station.

Similarly, slot assignment information sent to the calling station includes assignment information of a slot assigned to the calling station and assignment information of a slot assigned to the called station. More specifically, the calling and called stations send a burst signal to a predetermined time slot, and fetch it therefrom, thereby the calling and called stations are associated with each other using the time slot. In response to the slot assignment information, the calling station sends the ACK to the master station in step (F), and the called station sends the ACK to the master and calling stations in step (G). In step (H), the calling station sends data transmission start information to the called station at a given timing. In step (I), the called station sends to the calling station the ACK indicating that reception is ready.

In step (J), the calling station sends transmission signals DATA1 to DATAn to the called station using the assigned time slot. In step (K), since transmission is completed, the calling station performs channel disconnection control for sending a disconnection request to the master and called stations. In step (L), the called station similarly performs channel disconnection control for sending a disconnection request to the master and calling stations. In step (M), the master station receives the disconnection requests from the calling and called stations, and releases the assignment of the time slot assigned to these stations.

To summarize, in the demand assignment system, the master station performs channel assignment control for a plurality of slave stations. In the conventional demand assignment system, a reception enable/disable state of the called station is checked during channel connection control in addition to availability of the channel. During channel assignment control, a channel assignment condition is grasped and retrieved to assign a slot to the calling station, and slot assignment is performed for the called station, so that correlation between the calling and called stations is established with reference to the time slot. During transmission/reception end processing, the disconnection requests from both the calling and called stations are received to release slot assignment.

However, in the TDMA radio communication system employing the conventional demand assignment system, the following problems are posed.

Since the master station controls availability of the channel, i.e., availability of time slots and a connection condition between the calling and called stations, it must process a large amount of data. When a plurality of stations issue channel connection requests and channel assignment requests at the same time, the processing requires much time, and a queue is easily formed. As a result, it is difficult to quickly perform channel setting and channel assignment.

In order to avoid this, the master station must have a high-grade function such as a parallel processing or high-speed processing function, resulting in an expensive master station.

Since a connection condition between the calling and called stations is controlled, the channel connection request of a new calling station is not accepted unless the receiving station is ready for reception. Even if the channel connection request or channel assignment request is accepted, signal transmission is performed after a response from the called station is received. Therefore, it takes much time from generation of calling until signal transmission, resulting in a long response time. As a result, the queue is more easily formed. In particular, in a satellite communication system, since earth stations are discretely located, the calling and called stations may have a difference in weather. Under this condition, taking into consideration the fact that the master or calling station may fail to receive a response from the called station, the above problem is very important.

Since the calling and called stations are correlated with reference to a time slot, when the calling station changes a called station, the channel assignment procedure and the like must be retarded. For this reason, channel control becomes complicated, and it is difficult to improve transmission efficiency. In other words, a called station cannot be changed during a series of signal transmission procedures.

SUMMARY OF THE INVENTION

It is an object of the present invention to provide a TDMA radio communication system which can shorten a processing time required for channel setting determination or channel assignment of a calling station.

It is another object of the present invention to provide a TDMA radio communication system wherein a calling station can change a called station during a series of signal transmission procedures.

According to the present invention, a TDMA radio communication system has a plurality of stations including a master station and slave stations which are connected through the TDMA channel. The master station comprises: channel connection control means for receiving a channel connection request from a calling slave station, determining based on availability of the channel whether or not the channel can be assigned, and transmitting a response signal to the calling slave station by adding the determination result to the response signal; channel control means for receiving a slot assignment request from the calling slave station and transmitting slot assignment information of the TDMA radio channel to the calling slave station; and release means for receiving a disconnection request from the calling slave station and releasing assignment of a slot assigned to the calling slave station. Each slave station comprises: channel connection request means responsive to an input calling signal to perform the channel connection request to the master station; slot assignment request means for receiving an acknowledge signal for the channel connection request from the master station and sending the slot assignment request to the master station; slot detection means for detecting a slot assigned to the slave station as the calling station based on the received slot assignment information; address detection means for detecting an address of a destination device based on an input transmitting signal; called station determination means for determining a called slave station based on the address of the destination device detected by the address detection means; transmission control means for adding an address of the called slave station determined by the called station determination means to the input transmitting signal to form a transmission signal, and inserting the transmission signal into the time slot detected by the slot detection means; reception control means for receiving the transmission signal inserted in each time slot of the TDMA radio channel to detect the address of the called station included in each transmission signal, and fetching the transmission signal in which the address of the called station coincides with that of its own as a reception signal; and completion control means for transmitting the disconnection request in response to completion of the transmission operation of the transmission control means.

DESCRIPTION OF THE PREFERRED EMBODIMENT

A preferred embodiment of the present invention will be described hereinafter with reference to the accompanying drawings.

Figure 1:
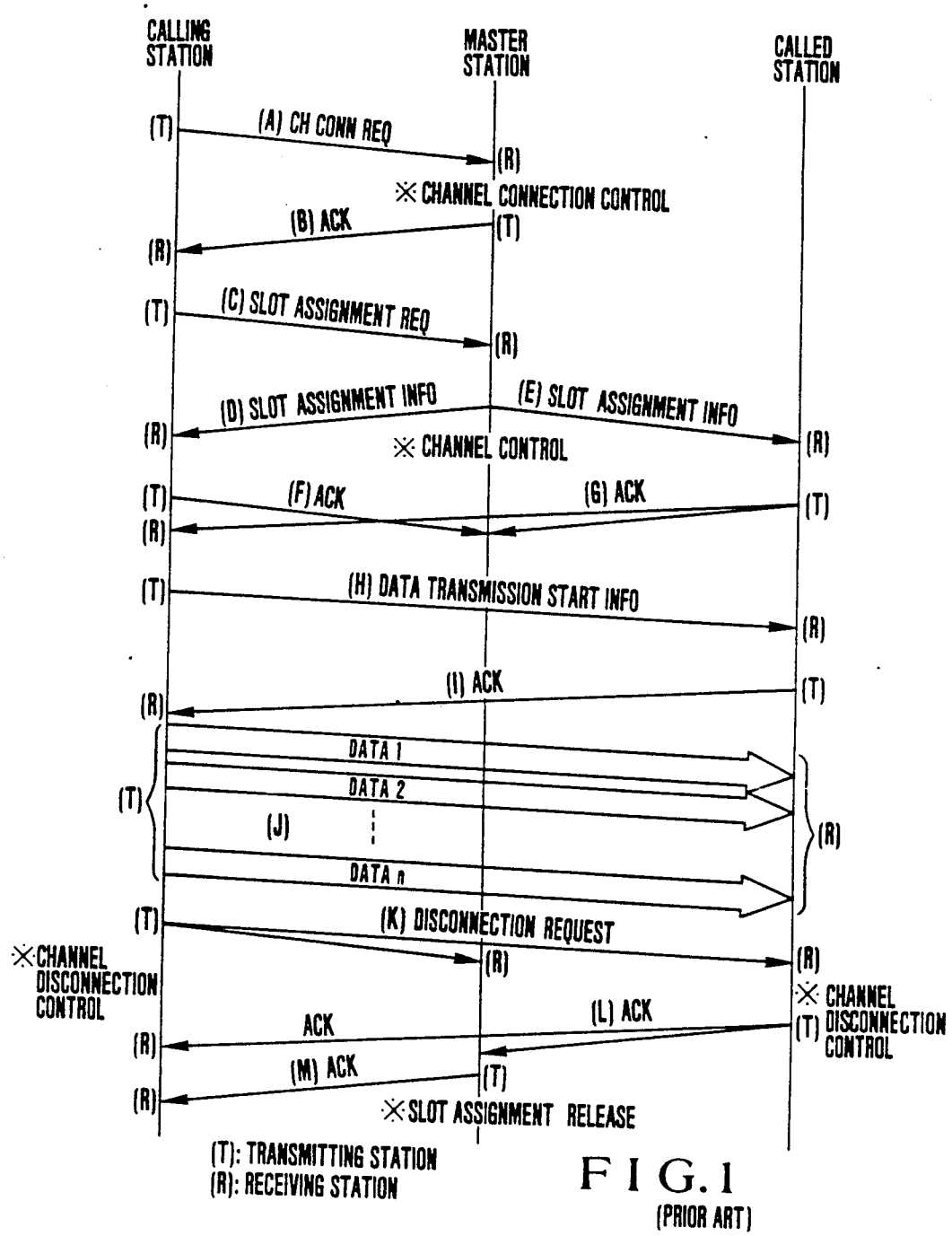
FIG. 1 is a sequence diagram for explaining an operation of a conventional TDMA radio communication system.
Figure 2:
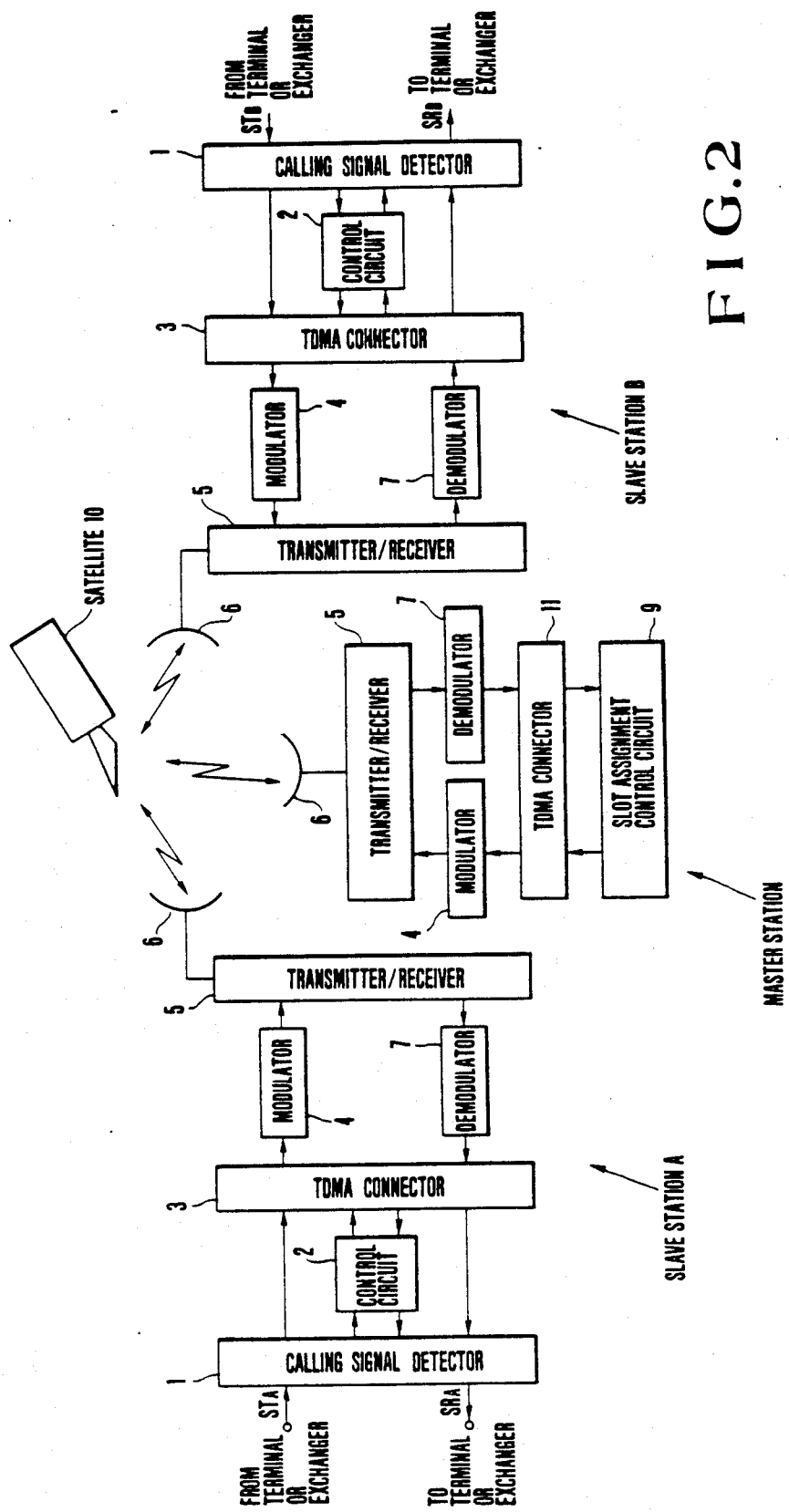
FIG. 2 is a block diagram showing an arrangement of a TDMA radio communication system according to an embodiment of the present invention.

FIG. 2 shows a TDMA radio communication system according to an embodiment of the present invention. The system of this embodiment is a satellite communication system in which a plurality of earth stations are connected via a satellite 10. The earth stations include a master station as a reference station, and a plurality of slave stations having the same arrangement. FIG. 2 illustrates only two slave stations A and B. The slave station A basically comprises a calling signal detector 1, a control circuit 2, a TDMA connector 3, a modulator 4, a transmitter/receiver 5, an antenna 6, and a demodulator 7.

In a transmission mode, the calling signal detector 1 receives a transmitting signal $ST_A$ from a terminal or an exchanger, and transfers it to the TDMA connector 3. The detector 1 detects a calling signal, and a variety of control information such as an address of a destination device, a data volume, or the like included in the transmitting signal $ST_A$, and sends the detected control information to the control circuit 2. For this reason, the detector 1 also has a function of address detection means.

In the reception mode, the calling signal detector 1 distributes the output signal from the TDMA connector 3 in accordance with a reception-side output signal from the control circuit 2, and sends it to a predetermined terminal or exchanger as a receiving signal $SR_A$.

The control circuit 2 mainly performs the following operations:

In the transmission mode, (1) the control circuit 2 forms a channel connection request signal in response to an input calling signal, and sends it to the TDMA connector 3 (channel connection request); (2) the circuit 2 receives an acknowledge signal for the channel connection request from the TDMA connector 3, forms a slot assignment request signal added with information associated with a necessary slot count, and sends it to the TDMA connector 3; (3) the circuit 2 receives the slot assignment information (transmitted from the master station in a broadcast mode) from the TDMA connector 3 so as to detect a time slot assigned to the calling slave station A, and supplying an instruction associated with use of the time slot to the TDMA 3 (note that the slot assignment information is fetched only by the slave station which issues the slot assignment request); (4) the circuit 2 determines the called slave station (one or more) based on the address information of the destination device in the control information input from the calling signal detector 1, and sends the address information of the called slave station to the TDMA connector 3 (determination of called station); (5) the circuit 2 forms a disconnection request signal upon completion of the transmitting operation of the TDMA connector 3, and sends it to the TDMA connector 3 (completion control); and so on.

In the reception mode, the control circuit 2 receives the address information (address of a destination device or calling station) from the TDMA connector 3 and supplies to the calling signal detector 1 an instruction indicating a terminal or exchanger corresponding to a destination of a receiving signal which is sent from the TDMA connector 3 to the calling signal detector 1. In this case, if there are a plurality of calling stations, identification is made in accordance with calling station addresses.

The TDMA connector 3 forms a timing signal associated with a time slot position or the like based on a reference signal received from the master station, and mainly performs the following operations.

In the transmission mode, the TDMA connector 3 adds an address of a called station sent from the control circuit 2 (and its own address, if necessary) to the transmitting signal from the calling signal detector 1 to form a transmission signal, inserts the transmission signal in a time slot indicated by the control circuit 2, and sends the transmission signal to the modulator 4 (transmission control). As a result, the transmission signal in the designated time slot is transmitted to a TDMA satellite channel through the modulator 4, the transmitter/receiver 5, and the antenna 6.

Figure 3:
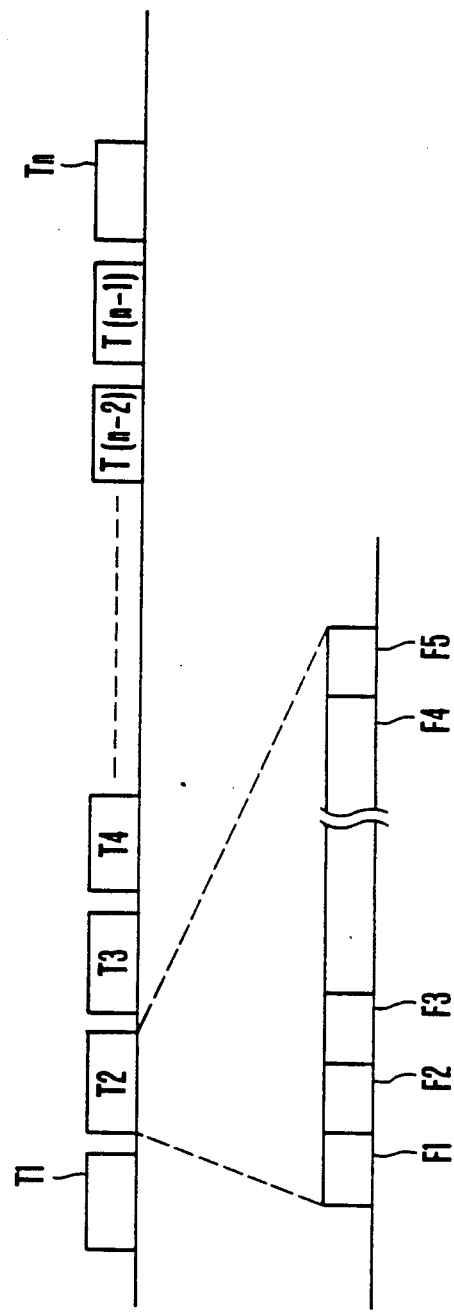
FIG. 3 is a view showing an example of a format of a transmission signal.

FIG. 3 shows the frame format of the TDMA satellite channel.

As shown in FIG. 3, the TDMA satellite channel consists of a plurality of slots (T1 to Tn), and the transmission signal inserted in each slot includes a transmitting signal start flag F1, a called station address field F2, a calling station address field F3, a transmitting information field F4, and a transmitting signal end flag F5.

In the reception mode, the TDMA connector 3 detects an address of a called station included in each transmission signal which is input through the antenna 6, the transmitter/receiver 5, and the demodulator 7, and is inserted in each time slot of the TDMA satellite channel. The TDMA connector 3 fetches the transmission signal whose called station address coincides with its own address from the corresponding time slot as a reception signal, and sends the reception signal to the calling signal detector 1 (reception control). At the same time, the connector 3 detects the calling station address and the address of the destination device from the fetched transmission signal, and supplies them to the control circuit 2.

The TDMA connector 3 detects the transmitting signal end flag F5 and informs that the transmission operation has been ended to the control circuit 2. The called station address field F2 includes the called station address and the address of the destination device. The TDMA connector 3 detects only the called station address, and sends the contents of the called station address field F2, which includes the called station address coinciding with its own address, and of the calling station address field F4.

The transmitting signal from an exchanger or terminal is transmitted or received using one or a plurality of time slots, as a matter of course.

The master station basically comprises the antenna 6, the modulator 4, the demodulator 7, a TDMA connector 11, and a slot assignment control circuit 9.

The TDMA connector 11 generates a reference signal serving as a reference transmission/reception timing of a plurality of slave stations, and sends it to the satellite 10 through the modulator 4, the transmitter/receiver 5, and the antenna 6. The TDMA connector 11 sends various signals supplied from the slot assignment control circuit 9 to the satellite 10. The TDMA connector 11 sends a channel connection request signal, a slot assignment request signal, and a disconnection request signal received from the satellite 10 through the antenna 6, the transmitter/receiver 5, and the demodulator 7 to the slot assignment control circuit 9.

The slot assignment control circuit 9 mainly performs the following operations. (1) The control circuit 9 receives the channel connection request from the calling slave station through the TDMA connector 11, determines based on availability of the channel whether or not the channel can be assigned, and adds the determination result to the response signal sent to the corresponding slave station (channel connection control); (2) the circuit 9 receives the slot assignment request from the calling slave station, and generates slot assignment information of the TDMA radio channel (channel control); and (3) the circuit 9 receives the disconnection request from the calling slave station, releases assignment of the time slot assigned to the corresponding slave station, and generates a response signal indicating this (release of slot assignment). Thus, the control circuit 9 sends these signals and information to the TDMA connector 11.

The transmission operation based on the demand assignment system employed in the TDMA radio communication system of the present invention will be described below with reference to the sequence diagram of FIG. 4.

Figure 4:
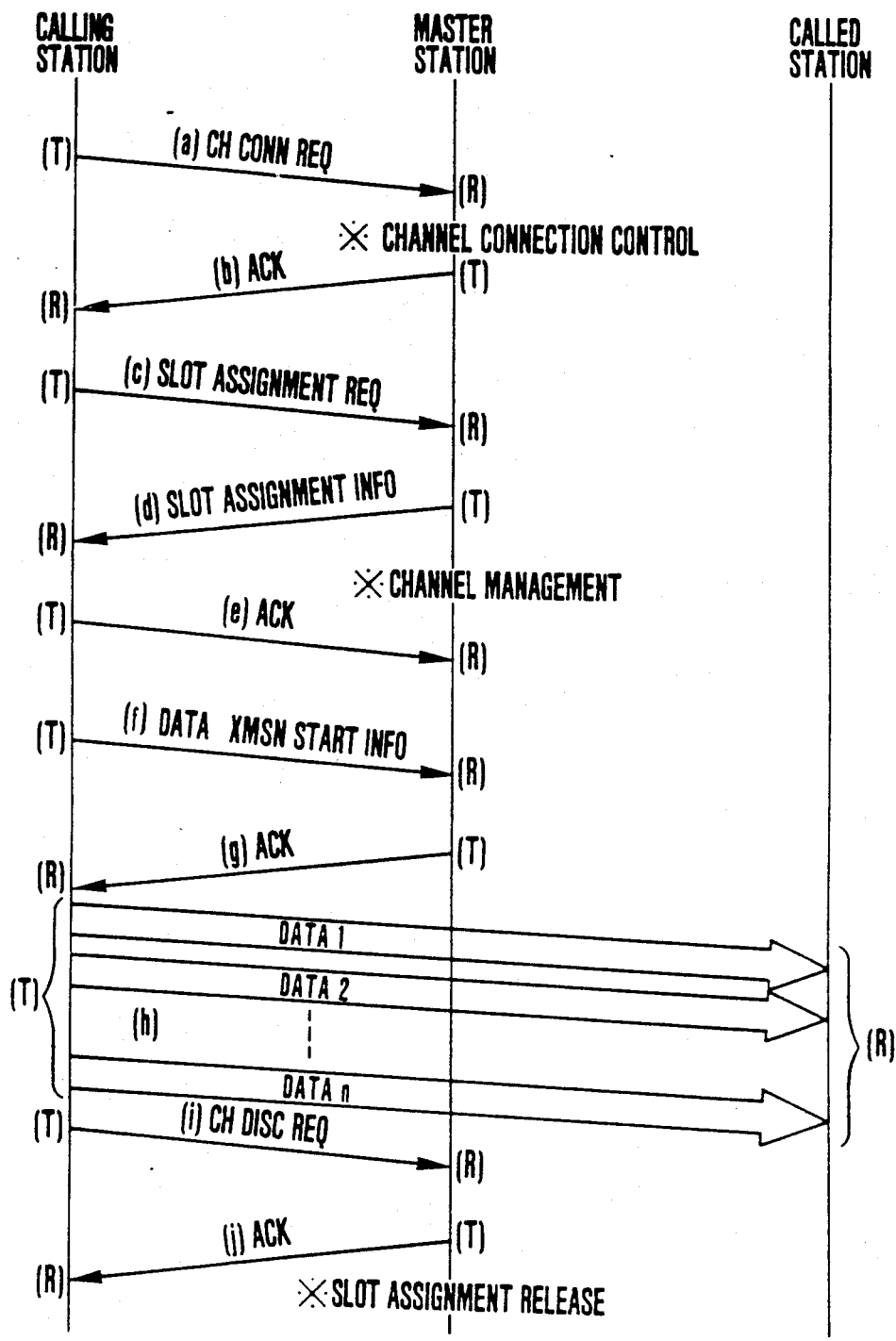
FIG. 4 is a sequence diagram for explaining the operation of the system shown in FIG. 2.

In FIG. 4, when the calling station receives a transmitting signal from a terminal or exchanger and detects a calling signal therefrom in step (a), it sends a channel connection request added with only an identification number of its own to the master station. In step (b), the master station performs channel connection control, that is, checks availability of the channel, i.e., the presence/absence of vacant time slots. As a result, if a vacant time slot is found, the master station sends back an acknowledge signal (ACK) to the calling station only on the basis of this fact. In other words, in the channel connection control, the channel connection status, i.e., the current connection status of the slave stations and reception availability of the called station are not taken into consideration. Therefore, it can be relatively quickly determined if the channel can be assigned. In step (c), the calling station sends an assignment request of the necessary number of slots to the master station. The called station is ignored.

In step (d), the master station performs channel control, i.e., searches a channel assignment condition, and determines time slots to be assigned (one or more time slots which do not always coincide with the requested number), and sends the slot assignment information to the calling station. In this case, slot assignment to the called station is not performed.

The calling station detects a slot assigned thereto according to the received slot assignment information, detects the address of the destination device from the input transmitting signal, and determines the called slave station based on the detected address of the destination device. The address of the determined called slave station is added to the input transmitting signal to form a transmission signal, and the transmission signal is inserted in the detected time slot. The transmission signal inserted in one time slot has one or more called station addresses. If the transmission signal has two or more called station addresses, it includes an address of its own as the calling station address in consideration of convenience for control of the called station.

In step (e), the calling station sends back the acknowledge response (ACK) to the master station. In step (f), the calling station sends data transmission start information (generated by the control circuit 2) to the master station prior to signal transmission.

In step (g), in order to define the signal transmission timing of the calling station, the master station sends back the ACK for the data transmission start information. Various methods of defining a signal transmission timing of the calling station may be employed, and the method according to the steps (f) and (g) is one of them. In step (h), the calling station sends the transmission signals DATA1 to DATAn using the slots assigned. The slave stations which do not perform the calling operation detect a coincidence/noncoincidence of its own address with the called station address in the called station address fields F2 of the transmission signals DATA1 to DATAn inserted in the time slots of the TDMA channel. A station which detects the coincidence serves as a called station.

The called station address is determined by the destination address of the transmitting signal generated by a terminal or an exchanger. For example, various transmission modes, which are hard to achieve in the conventional system, such as a case wherein terminals connected to different slave stations have one terminal connected to one slave station as a destination device, a case wherein a plurality of terminals connected to one slave station have terminals connected to different slave stations as destination devices, respectively, and a case wherein one terminal performs multi-address calling to terminals connected to a large number of slave stations, can be employed in a series of signal transmission procedures which are performed upon reception of a single slot assignment. The address of the calling station is included in the transmission signal of the calling station in consideration of 1-to-n communication or m-to-n communication although it is not required in 1-to-1 communication.

In step (i), since the transmission is completed, the calling station sends the disconnection request to the master station. In step (j), the master station performs slot assignment release processing, and sends back the ACK indicating this to the calling station. Thus, the calling station can unidirectionally perform channel disconnection regardless of the state of the called station.

As described above, according to the TDMA radio communication system of the present invention, channel setting determination for the channel connection request is performed with reference to only availability of the channel, i.e., the presence/absence of vacant time slots regardless of the condition of the called station, and slot assignment information for the channel connection request is supplied to only the calling station. Therefore, the master station need only control time slots, and need not control the channel connection conditions of the calling and called slave stations. Thus, a data volume processed by the master station can be reduced, and channel setting and slot assignment processing can be simplified. Channel setting determination and channel assignment processing can be quickly performed, and a time from generation of calling to signal transmission can be shortened. Thus, generation of queue can be eliminated.

In this invention, the calling and called stations are not correlated using time slots, but the transmission signal inserted in each time slot is added with a called station address. Thus, the calling station can change the called station during a series of signal transmission procedures, and a plurality of slave stations can be accessed using an identical time slot. Thus, transmission efficiency can be improved, and the time slots can be effectively used.

In particular, in a communication system, a multi-address calling function is often required. In this case, in the conventional system, time slots for a large number of called slave stations must be assigned. Thus, in consideration of this, the effect of the present invention will be understood.

What is claimed is:

1. A time division multiple access radio communication system comprising a master station, a plurality of slave stations, and a time division multiple channel connecting between said slave stations under control of said master station, said master station comprising:

channel connection control means for receiving a channel connection request from a calling slave station, determining based on availability of said channel whether or not the channel can be assigned, and transmitting a response signal to said calling slave station by adding the determination result to the response signal;

channel control means for receiving a slot assignment request from the calling slave station and transmitting slot assignment information of said time division multiple channel to said calling slave station; and release means for receiving a disconnection request from the calling slave station and releasing assignment of a slot assigned to the calling slave station;

each of said slave stations comprising:

channel connection request means responsive to an input calling signal received from the master station to perform the channel connection request to said master station;

slot assignment request means for receiving an acknowledge signal for the channel connection request from said master station and sending the slot assignment request to said master station;

slot detection means for detecting a slot assigned to said slave station as the calling station based on the received slot assignment information;

address detection means for detecting an address of a destination device based on an input transmitting signal received from the master station;

called station determination means for determining a called slave station based on the address of said destination device detected by said address detection means;

transmission control means for adding an address of said called slave station determined by said called station determination means to the input transmitting signal to form a transmission signal, and inserting the transmission signal into the time slot detected by said slot detection means;

reception control means for receiving the transmission signal inserted in each time slot of the time division multiple channel to detect the address of said called slave station included in each transmission signal, and fetching the transmission signal in which the address of said called slave station coincides with that of its own as a reception signal; and completion control means for transmitting the disconnection request in response to completion of the transmission operation of said transmission control means.

2. A system according to claim 1, wherein said transmission control means of each of said calling slave stations causes an address of its own to be included in the transmission signal formed thereby.

3. A method for controlling a time division multiple access radio communication system comprising a master station, a plurality of slave stations, and at least one time division multiplex channel interconnecting said slave stations under control of said master station, said method as practiced at said master station comprising the steps of:

(a) receiving a channel connection request signal from a calling slave station;

(b) determining an availability of said requested channel depending upon whether or not the channel requested in step (a) is idle and can be assigned;

(c) transmitting a response signal to said calling slave station by adding a determination result found in step (b) response to the step (a) signal;

(d) receiving a slot assignment request from the calling slave station;

(e) transmitting to said calling slave station information relating to slot assignment on said time division multiplex channel; and (f) releasing the slot assigned to the calling slave station in step (d) in response to a disconnection request from the calling slave station;

said method as practiced at each of said slave stations comprising the steps of:

(g) sending a channel connection request signal to said master station responsive to a receipt at said slave station of an input calling signal indicating a need for the channel connection of step (a);

(h) receiving from said master station an acknowledge signal for the channel connection request and, responsive thereto sending a slot assignment request to said master station;

(i) detecting a calling station slot assignment in the time division multiplex channel, said slot being assigned to said calling slave station based on the slot assignment information received in step (h);

(j) detecting an address in a calling slave station, and address being a destination devise based on an input transmitting signal which is originated by a calling line coupled to said calling slave station;

(k) determining an identity of a called slave station based on the address of said destination detection that occurs in step (j);

(l) adding an address of said called slave station as determined in step (k) to the input transmitting signal received in step (j) in order to form a further transmission signal;

(m) inserting the further transmission signal into the time slot detected in step (i);

(n) receiving the further transmission signal inserted in each time slot in step (m) in order to detect the address of said called slave station added in step (1) to each further transmission signal;

(o) fetching a reception signal in response to the further transmission signal in which the address of said called slave station coincides with the address of the slave station receiving the transmissions signal in step (n); and (p) transmitting the disconnection request signal of step (f) in response to a completion of a transmission.

4. A system according to claim 1, wherein step (1) includes a further step in each of said calling slave stations which causes an inclusion of a calling slave station address in the further transmission signal.

* * * * *